(No Model.)
J. B. IVEY.
SAW SETTING MACHINE.
No. 471,641.  Patented Mar. 29, 1892.
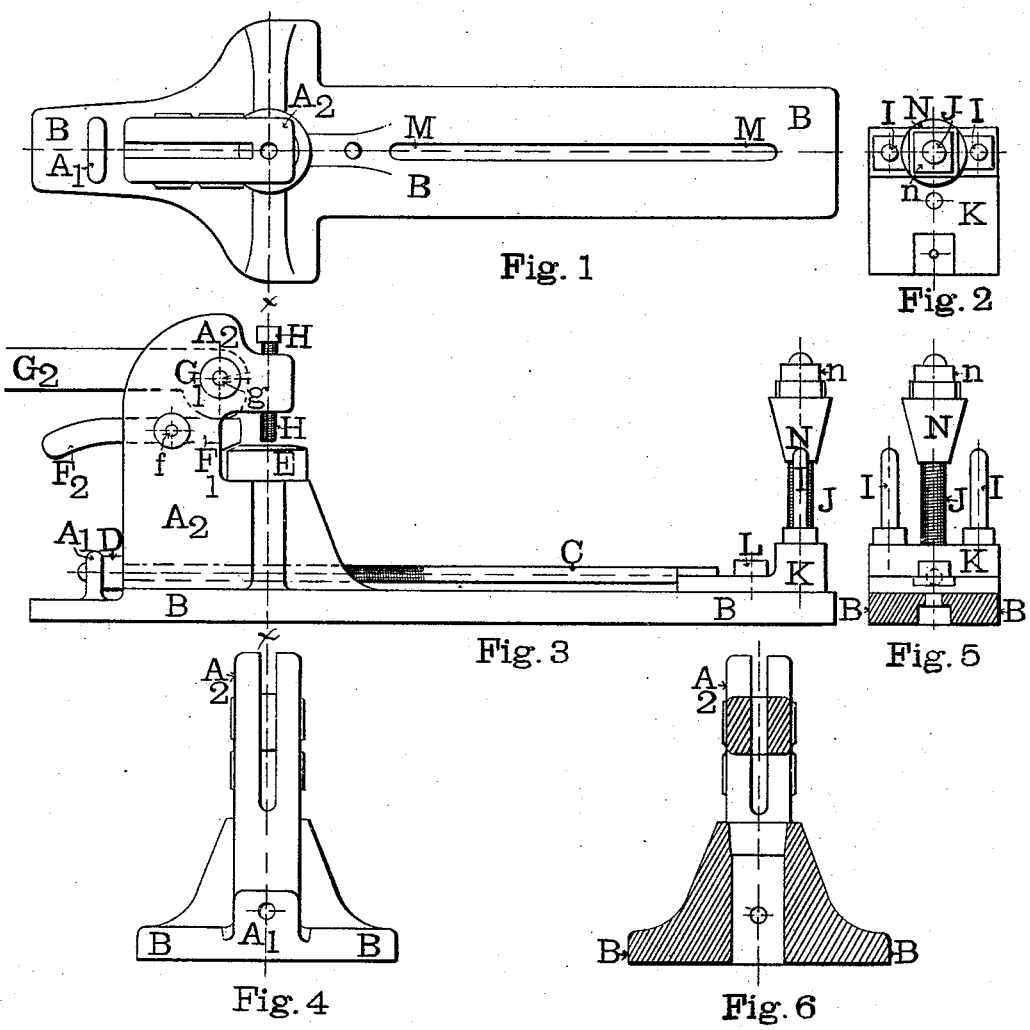
Witnesses:  Inventor:
James Burnett Ivey
THE NORRIS PETERS CO., PHOTO-LITHO., WASHINGTON, D. C.

UNITED STATES PATENT OFFICE.

JAMES BURNETT IVEY, OF MACON, GEORGIA.

SAW-SETTING MACHINE.

SPECIFICATION forming part of Letters Patent No. 471,641, dated March 29, 1892.

Application filed July 18, 1890. Serial No. 359,234. (No model.)

*To all whom it may concern:*

Be it known that I, JAMES BURNETT IVEY, a citizen of the United States, residing at Macon, in the county of Bibb and State of Georgia, have invented a new and useful Saw-Setting Machine, of which the following is a specification.

In order that a saw may work properly, its teeth must not only be sharp, but they must be set or bent sidewise, one of each successive pair being inclined laterally to the right, while the next is inclined laterally to the left, and thus the teeth can cut a furrow wide enough to enable the saw to work freely. Heretofore this setting of the teeth has generally been effected by either of the two following methods:

First. By hammering them. This is regarded as very objectionable, first, because of the great length of time required for the operation; second, because the teeth, being more or less elastic, do not always yield in such a manner to the blows of the hammer as to slant laterally uniformly; third, because this process often unduly strains the fiber of the saw's material, frequently causing cracks therein, and sometimes breaking the teeth off at once. It is therefore regarded as very dangerous, particularly in cases in which the saw is to run at a high rate of speed.

Second. By bending them by pressure applied by tools. This method is regarded as far better than the preceding; but none of the devices used for this purpose that are known to me appear to be either perfect in operation or so complete in their construction as to give thoroughly uniform and satisfactory results.

My invention relates to improvements in that class of saw-setting machines in which a block or anvil supports the saw's tooth to be set, while the saw's center is carried by a rest; and the objects of my invention are, by means of a cheap, durable, and simple device, to give an accurate and uniform lateral inclination to the teeth without injury to the saw, and to do this in much less time than that consumed by other methods. I attain these objects by means of the cam-and-lever mechanism illustrated in the accompanying drawings, to which reference is to be had, and in which similar letters refer to similar parts throughout the several views.

Figure 1 is a plan view of my improved machine. Fig. 2 is a similar view of one end of the machine. Fig. 3 is a side elevation. Fig. 4 is a rear elevation. Fig. 5 is a front elevation partly in section, and Fig. 6 is a transverse vertical section on line $x\ x$ of Fig. 3.

The body of the apparatus has a flat bed B B, perforated by a long straight slit M M of uniform width. Attached to and standing upon the bed B B is an upright curved arm $A^2$, slit vertically through the center of its top by an opening of uniform width and likewise containing a hole in which rests an anvil-block E below the level of the top of said arm $A^2$. Behind the arm $A^2$ stands another upright arm A', secured also on the top of the bed B B. Both of the arms A' and $A^2$ are perforated by a central horizontal circular hole above and parallel to the bed-slit M M, for a purpose hereinafter mentioned.

In the slit of the arm $A^2$ there are placed so as to move freely vertically a cam G', having a handle $G^2$ and pivoted on a pin $g$, passed through and across said arm $A^2$, and also a lever F' $F^2$, moving below the cam and pivoted upon a pin $f$, likewise passing through and across the arm $A^2$. This lever is so placed that its end F', beveled on the under surface, can, by means of the pressure of the cam G', be driven down upon the anvil E. The other end $F^2$ of the lever being the heaviest acts as a counter-balance, causing the end F' to rise when the cam's pressure is removed. The anvil-block E rests in a hole provided therefor in the upright arm $A^2$ and has a beveled upper edge which may be so made as to vary gradually from a very slight inclination to the horizontal plane to a very great one, according to the judgment of the designer. If the anvil-block and its hole are made cylindrical or conical, the former may be turned at pleasure in the latter in order to place under the lever a greater or less inclined upper edge, as desired. A carriage-block K slides on the bed B B, being attached to a horizontal rod C, passing through the hereinbefore-mentioned holes in the arms A' and $A^2$. This rod is secured at one end to the carriage-block and toward the other end is screw-threaded and passes through a nut D, turning on it and confined between the arms A' and $A^2$. It is evident that by turning the nut in one direction or the other the carriage-block will at pleasure be drawn toward the arm A² or thrust from it. A vertical clamp-screw L passes through both the carriage-block and the bed-slit M M, having its head under the bed and its nut above the carriage-block. By this means the carriage-block can be held fixed on the bed at any desired place within the range of its travel.

Secured in the top of the carriage-block are two vertical studs I I, whose top extremities are in the same horizontal plane as the face of the anvil, being so adjusted by nuts or other suitable means. Midway between these studs I I stands another vertical stud J, which is screw-threaded and passes through the center of an inverted cone N, turning freely thereon. The top of this cone terminates in a nut, so as to be rotated by a wrench, and the cone's center hole is threaded, so as to fit the studs' threads. A jam-nut $n$ also is shown in the drawings above the cone and can be used, if desired. A vertical set-screw H passes through and turns freely in the outer horizontal end of the upright arm A², said arm end acting as a nut therefor. This screw is so placed that it can be run down in order to touch the upper face of the anvil-block E, and the purpose of this screw will be stated hereinafter.

The operation of this device is as follows: The cone and its jam-nut having been removed, the saw is then so placed that its center hole or eye admits the stud J. Its middle lies upon the upper ends of the studs I I and one of its teeth rests upon the anvil-block. In order to complete this adjustment and also to suit saws of different diameters, the carriage-block K is by means of the rod C and its nut D drawn toward or driven away from the arm A² as much as is necessary. The clamp-screw L is then tightened, so as to hold the carriage-block securely at rest upon the bed, and the cone N is put on the stud J and screwed down until it presses firmly within the eye of the saw, the cone having the shape shown in order to fit saw-eyes of different sizes. The anvil-block is then turned around so as to bring under the lever F' F² that part of the edge having the desired inclination. The set-screw is then run down so as to slightly touch the upper surface of the saw, thus not preventing the saw's rotation, and the handle G² is lowered, rotating the cam G', which in turn presses down the lever's beveled end F' upon the saw-tooth, thus crowding the latter down upon the beveled upper edge of the anvil, and thereby giving the tooth the required set or lateral inclination. The handle G² is then lifted, the cam G' turns backward so as to liberate the lever, and the latter's end F', being counterbalanced by the heavier end F², rises at once from the tooth and frees it. The saw is then turned so as to bring the next tooth but one to its proper place on the anvil and the foregoing operation is repeated. After half of the teeth have been thus set the cone and jam-nut are unscrewed from the stud J, and the saw is lifted off, turned over, and replaced on the machine. The cone and jam-nut are once more screwed home on the stud J to their places and the remaining teeth are then set as before. A lever, as shown, in direct contact with the saw is preferred in use rather than the cam alone, because if the cam should bear directly on the saw there would be a frictional grinding thrust or pull on the latter, dependent upon the direction in which the handle G² moves, and either of these operations would probably result in injury or even perhaps ruin to the saw. Therefore the lever, which acts by pressure only upon the tooth and is not injured by friction against the cam while their surfaces of contact are kept properly smooth and lubricated, is used.

The object of the set-screw H is to aid in keeping the saw truly in position, thus preventing it from buckling or springing out of shape when the cam's pressure is applied to the lever and thereby transmitted to the tooth to be set.

I am aware that prior to my invention saw-setting devices have been made having anvils and also cones whose smaller ends were uppermost. I therefore do not claim either the anvil or cone, broadly; nor do I claim the cone as placed with the small end uppermost; but What I do claim, and desire to secure by Letters Patent, is—

1. In a saw-set, the combination, with a revoluble anvil and a counterbalance-lever so located that its shorter arm projects over the edges of the anvil, of a cam located in position to co-operate with the short arm of the counterbalance-lever, whereby the latter may be forced in contact with the teeth of a saw interposed between the anvil and lever, substantially as set forth.

2. In a saw-set, the combination, with a revoluble anvil, the latter having a beveled upper edge, the inclination of which beveled portion gradually varies throughout its length, of a counterbalance-lever the shorter arm of which projects over the beveled upper edge of the anvil, and a cam arranged and constructed to co-operate with the lever to force the latter against the teeth of a saw interposed between said lever and anvil, substantially as set forth.

3. The combination, with an anvil and mechanism, substantially as described, for co-operating therewith to set the teeth of a saw, of a carriage, a screw for moving the carriage, means for locking the carriage in place, adjustable studs on the carriage, an inverted cone, and means for holding the studs and cone in place, substantially as set forth.

4. The combination, with a bed-plate having a longitudinal slot formed therein, an arm or standard secured at one end of the bed-plate, said arm recessed, an anvil in the recess, a set-screw over the anvil, and cam mechanism for setting the teeth of saws placed over the anvil, of a carriage guided by the longitudinal slot, a screw secured to the carriage and passing through the fixed arm or standard, a nut on the screw which by a rotary movement imparts an endwise movement to the carriage, adjustable studs on the carriage, an adjustable cone, and means for locking the studs, cone, and carriage in place, substantially as set forth.

JAMES BURNETT IVEY.

Witnesses:
 E. O. COHEN,
 MATT. R. FREEMAN.